United States Patent [19]

Miller

[11] 4,195,879
[45] Apr. 1, 1980

[54] INFANT'S OR CHILD'S SEAT FOR SNOWMOBILES OR THE LIKE

[75] Inventor: Stephen J. Miller, Daniel, Wyo.

[73] Assignee: Virginia Miller, Daniel, Wyo.

[21] Appl. No.: 934,098

[22] Filed: Aug. 16, 1978

[51] Int. Cl.² ............................................. A47D 1/10
[52] U.S. Cl. .................................... 297/184; 297/250
[58] Field of Search ............... 297/250, 243, 184, 216, 297/DIG. 9

[56] References Cited

U.S. PATENT DOCUMENTS

| 3,008,761 | 11/1961 | McIlvaine | 297/184 X |
| 3,269,773 | 8/1966 | O'Connor | 297/243 X |
| 3,922,034 | 11/1975 | Eggert | 297/216 |
| 3,934,934 | 1/1976 | Farrell et al. | 297/250 |
| 3,940,166 | 2/1976 | Smithea | 297/DIG. 9 |
| 4,026,448 | 5/1977 | Lewis | 297/243 |
| 4,027,915 | 6/1977 | Anderson et al. | 297/184 |

FOREIGN PATENT DOCUMENTS 594731 11/1947 United Kingdom .................... 297/243

Primary Examiner—Francis K. Zugel
Attorney, Agent, or Firm—Mallinckrodt & Mallinckrodt

[57] ABSTRACT

An infant's or small child's protective seat constructed for securement to a snowmobile, motorcycle, or similar vehicle has a rigid and structurally strong, body-receiving seat structure preferably integrally formed with upstanding back wall and side walls for enclosing substantially the entire body of the occupant in seated position, and has a transparent, bubble-type hood hingedly connected to the upper part of the back wall for seating upon the side walls when in closed position and for swinging backwardly into open position to permit entry to and exit from the seat. A body-restraining harness is anchored to the seat structure for holding the occupant firmly in the seat, and means are provided for latching the hood in its closed position. Means are also provided for detachably securing the seat structure to the vehicle in superimposed position on the vehicle's seat.

8 Claims, 6 Drawing Figures

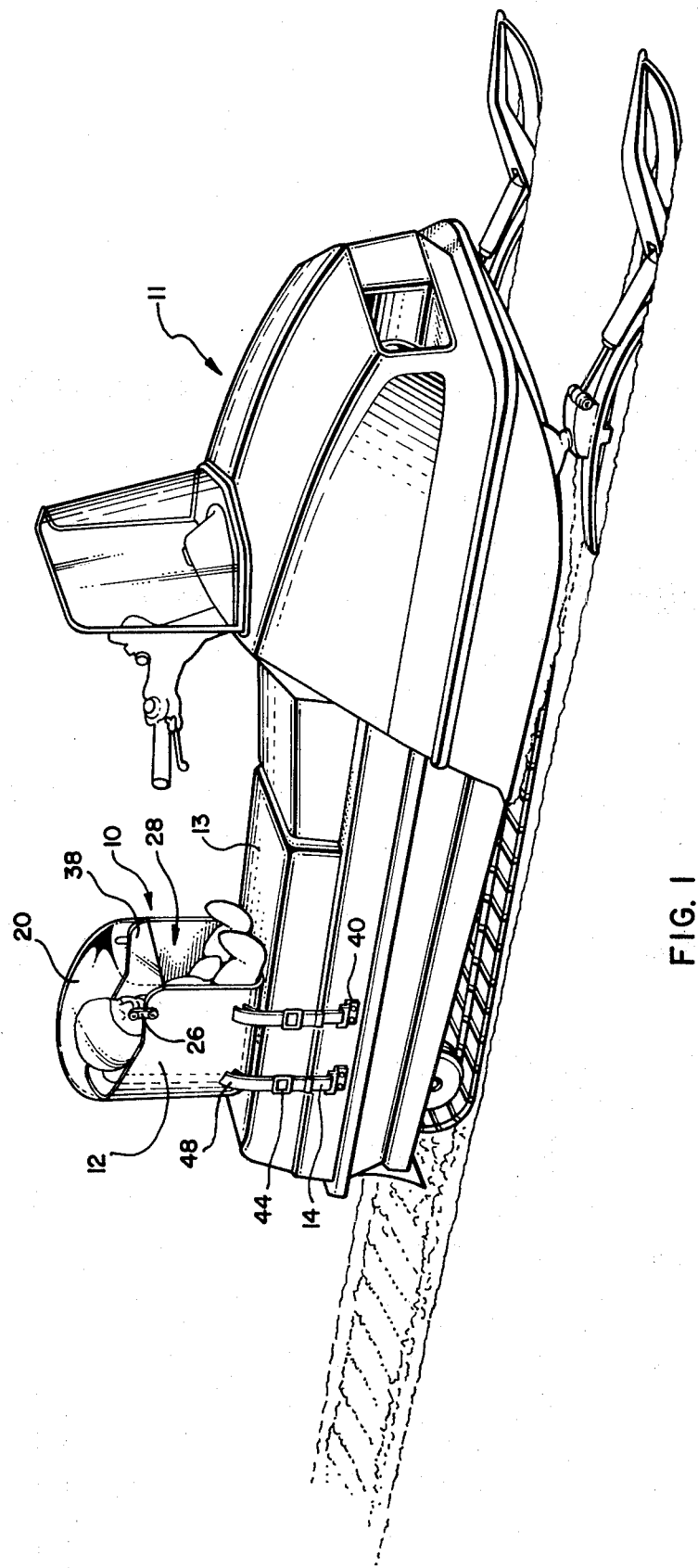

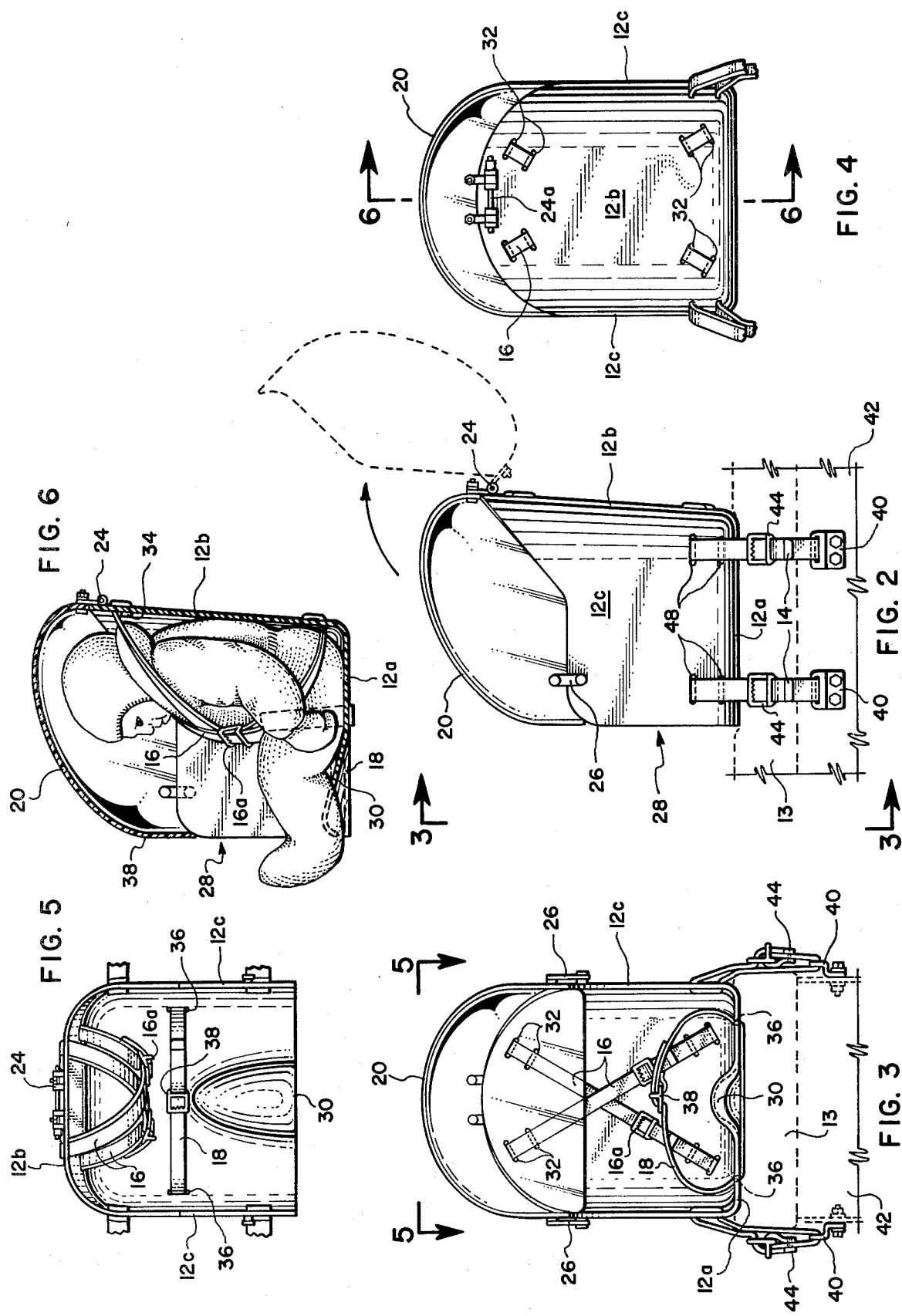

INFANT'S OR CHILD'S SEAT FOR SNOWMOBILES OR THE LIKE

BACKGROUND OF THE INVENTION

1. Field

The invention is in the field of safety seats for infants or small children when riding in or on vehicles.

2. State of the Art

Numerous safety seats for infants and small children are currently available for use in automobiles. Such seats are designed to restrain forward movement of the occupant in the event of an abrupt stop of the vehicle in an emergency situation or in an accident, and are used in conjunction with standard types of automobile seats and seat belts. Such safety seats do not in themselves provide protection from the weather or from impact. The automobile body is relied on for such protection.

With the increased usage of vehicles other than automobiles, such as snowmobiles, bicycles, and motorcyles, there is a need for a safety seat which not only restrains an infant or small child from being pitched forwardly upon impact of the vehicle against some other vehicle or obstruction, but which also protects it from the elements and from direct impacts against hard surfaces. Such protection is particularly necessary in the case of snowmobiles, which are used in cold and often inclement weather and under circumstances in which occasional overturning is not uncommon.

SUMMARY OF THE INVENTION

According to the invention, an infant's or small child's safety seat has a rigid and structurally strong, body-receiving seat structure with upstanding back wall and side walls for enclosing substantially the entire body of the occupant in seated position, and a transparent, bubble-type hood hingedly connected to the upper part of the back wall for seating upon the side walls when in closed position and for swinging backwardly into open position to permit easy entry and exit from the seat. Lap and shoulder belts are provided and adapted to hold an occupant of the seat firmly in position.

The safety seat is adapted to be detachably secured to the vehicle, preferably by strapping it to the body of the vehicle at opposite lateral sides of the longitudinally extending vehicle seat, so that the bottom of the safety seat is held firmly against the vehicle seat in tandem with the driver's position thereon.

THE DRAWINGS

The best mode presently contemplated of carrying out the invention is illustrated in the accompanying drawings in which:

FIG. 1 is a pictorial view of the infant's or child's safety seat of the invention attached to a snowmobile in one of two possible positions;

FIG. 2, a fragmentary side elevation showing the safety seat of the invention and portions of the snowmobile seat and chassis, the view being drawn to a larger scale and showing in broken lines the bubble-type hood retracted, structure only and not the occupant being illustrated;

FIG. 3, a corresponding view in front elevation;

FIG. 4, a corresponding view in rear elevation, showing only the safety seat structure;

FIG. 5, a corresponding view in top plan; and

FIG. 6, a vertical section taken on the line 6—6 of FIG. 4, and showing the child in position within the seat.

DETAILED DESCRIPTION OF THE ILLUSTRATED EMBODIMENT

As illustrated in FIG. 1, seat 10 of the invention is shown mounted upon a snowmobile 11, one of the vehicles with which it may be used to advantage. Such seat 10 includes a body-receiving seat structure 12 in which an infant or child is seated for riding purposes. Seat structure 12 is detachably secured to seat portion 13 of snowmobile 11 by strap and buckle assemblies 14, so that it is restrained from falling or being thrown from the snowmobile during its operation. Seat structure 12, FIGS. 2, 3 and 6, comprises a seat bottom 12a, a seat back 12b, and seat sides 12c at opposite lateral sides, respectively, of seat bottom 12a.

The infant or child is restrained within seat structure 12 from excessive movement and from being thrown from the vehicle by chest straps 16 and lap strap 18, FIGS. 3 and 6.

A transparent, rigid hood 20 is mounted at the upper end of seat back 12b and normally rests upon seat sides 12c to protect the face of the infant or child from exposure to cold wind occurring naturally or created by the rapid movement of the snowmobile and to otherwise protect the body of the infant or child. The protection provided by hood 20 is particularly important because of the wind chill factor and the general sensitivity of the skin of infants and children to wind burn.

Transparent hood 20 is preferably attached to seat back 12b by a hinge assembly 24, FIGS. 2 and 6, which preferably provides for detachment of such hood by pulling the hinge pin 24a. Hood 20 may be swung backwardly, as is indicated by broken lines in FIG. 2, to facilitate placement of the infant or child within seat structure 12. Thereafter, hood 20 may be rotated into position over the occupant's head and secured in its protective position by suitable latch assemblies, as at 26. Seat structure 12 is preferably formed with an open front, as at 28, which facilitates placement and removal of the child into and from seat 10.

Seat structure 12 and hood 20 are constructed of sturdy materials to reduce likelihood of injury to the child in the event the carrying vehicle should overturn. Suitable materials for seat 12 include plastics, fiber reinforced plastics, and metals of sufficient thicknesses to withstand substantial impact without incurring significant damage. Hood 20 may be constructed of relatively thick "Plexiglass" or other non-shattering, transparent, plastic material.

Side walls 12c of seat 12 preferably extend upwardly sufficiently to protect the shoulders of a seated infant or child, yet to permit substantially unrestricted lateral vision. Back 12b of the seat structure preferably extends high enough to protect the seated infant's or child's head and to provide firm anchorage for shoulder harnesses 16. Seat bottom 12a may be contoured, if desired, for example as shown at 30 in FIGS. 3, 5, and 6. This aids the seated infant or child to maintain a generally upright posture and tends to prevent forward sliding so that restraining straps 16 and 18 remain relatively loose and comfortable. Seat structure 12 is preferably integrally molded to shape.

Body restraining straps 16, preferably arranged to cross over the body of the occupant, are anchored to back 12b of seat 12 in any suitable manner, such as by passing them through slots 32 and by providing respective headed ends 34. Opposite ends of such straps 16 are provided with adjustable buckles of any suitable type, such as those shown at 16a.

Lap strap 18 of usual seat belt type is secured to seat bottom 12a in any suitable manner, such as by being passed through slots 36. Its opposing ends are provided with adjustable buckles 38, which may be similar to those of straps 16.

Transparent hood 20 is generally bubble shaped to enclose and protect the head of the seated infant or child, while permitting substantially unrestricted vision forwardly and laterally. If desired, hood 20 may be removably secured to body 12 in any suitable manner instead of being hinged thereto.

In securing seat 10 to the body and seat of the snowmobile by the tie down strap assemblies 14, such strap assemblies are attached to brackets 40, FIGS. 1, 2, and 3, which, in turn are rigidly secured to snowmobile body 42 below seat cushions 13, as by bolting. Such strap assemblies 14 are provided with adjustable buckles 44, so that seat 12 may be drawn down tightly against seat cushions 13 of the snowmobile. The straps of strap assemblies 14 are conveniently attached to seat body 12 by passing them through respective pairs of spaced apart slots 48. Seat 12 may be positioned facing either forwardly or backwardly with relation to the snowmobile.

Although the seat of the invention has been illustrated with respect to its use on a snowmobile, it may easily be used on a motorcycle, trail bike, or the like, since both are equipped with vehicle seats similar to those on snowmobiles. It is only necessary to install brackets similar to the brackets 40 below the vehicle seat, so that the seat of the invention may be placed upon and tightened against it.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An infant's or small child's seat for use upon a vehicle in which the driver normally sits astride a longitudinally extending vehicle seat and is exposed to the atmosphere, comprising a body-receiving and protecting seat structure having a seat member with upstanding back and sides terminating in upper edges; a substantially rigid, transparent, bubble-type hood adapted to fit over said seat structure with its lower peripheral side and rear edge portions resting on said back and sides upper edges thereof to protect the head of the seated occupant from the elements and from impact if the vehicle tips over; means for securing said hood in place on said seat structure; safety strap means within said seat structure for securing the occupant therein; and means for detachably securing the seat structure in superimposed position on a portion of the longitudinally extending seat of the vehicle.

2. An infant's or small child's seat in accordance with claim 1, wherein the means for securing the hood to the seat structure comprises a hinge arrangement normally securing the hood to the upper portion of the back of the seat for swinging backwardly and forwardly, and latch means for securing said hood to the sides of the seat structure in the forwardly swung position of the hood.

3. An infant's or small child's seat in accordance with claim 1, wherein the safety strap means comprises body straps and a seat belt.

4. An infant's or small child's seat in accordance with claim 1, wherein the front of the seat structure is open.

5. An infant's or small child's seat in accordance with claim 1, wherein the seat structure is integrally formed from a strong material.

6. An infant's or small child's seat in accordance with claim 1, wherein the means for detachably securing the seat structure to the vehicle includes straps secured to the seat structure and adapted to mate with brackets attached to the vehicle body below the portion of the vehicle seat on which the child's seat is superimposed.

7. An infant's or small child's seat in accordance with claim 6, wherein the vehicle is a snowmobile.

8. In combination, a snowmobile having a longitudinally extending seat upon which the driver normally sits astride and having brackets for the passage of straps therethough secured to the snowmobile body on either side of and below a portion of the seat; and an infant's or small child's seat comprising a body-receiving and protecting seat structure having a seat member with upstanding back and sides terminating in upper edges, a substantially rigid, transparent, bubble-type hood adapted to fit over said seat structure with its lower peripheral side and rear edge portions resting on said back and sides upper edges thereof to protect the head of the seated occupant from the elements and from impact if the vehicle tips over, means for securing said hood in place on said seat structure, safety strap means within said seat structure for securing the occupant therein, and straps attached to said seat body for securement to the brackets on the snowmobile for detachably securing the seat structure in superimposed position on a portion of the longitudinally extending seat of the snowmobile.

* * * * *